(12) United States Patent
Blödt (10) Patent No.: US 10,989,584 B2
(45) Date of Patent: Apr. 27, 2021

(54) METHOD FOR MEASURING FILL LEVEL OF A FILL SUBSTANCE LOCATED IN A CONTAINER BY MEANS OF TERAHERTZ PULSES

(71) Applicant: Endress+Hauser SE+Co. KG, Maulburg (DE)

(72) Inventor: Thomas Blödt, Steinen (DE)

(73) Assignee: Endress+HauserSE+Co. KG, Maulburg (DE)

(*) Notice: Subject to any disclaimer, the term of this patent is extended or adjusted under 35 U.S.C. 154(b) by 128 days.

(21) Appl. No.: 16/079,604

(22) PCT Filed: Feb. 13, 2017

(86) PCT No.: PCT/EP2017/053100
§ 371 (c)(1),
(2) Date: Aug. 24, 2018

(87) PCT Pub. No.: WO2017/148688
PCT Pub. Date: Sep. 8, 2017

(65) Prior Publication Data
US 2019/0094060 A1 Mar. 28, 2019

(30) Foreign Application Priority Data
Mar. 2, 2016 (DE) .................... 10 2016 103 740.0

(51) Int. Cl.
*G01F 23/284* (2006.01)
*G01F 23/292* (2006.01)
(Continued)

(52) U.S. Cl.
CPC .......... *G01F 23/284* (2013.01); *G01F 23/292* (2013.01); *G01F 23/2925* (2013.01);
(Continued)

(58) Field of Classification Search
CPC .................................................... G01S 13/227
See application file for complete search history.

(56) References Cited

U.S. PATENT DOCUMENTS 3,695,107 A * 10/1972 Hertz .................... G01F 23/284
73/290 R
4,135,397 A * 1/1979 Krake ................... G01F 23/284
324/601
(Continued)

FOREIGN PATENT DOCUMENTS

CN  103502782 A  1/2014
DE  102012011165 A1  12/2013
(Continued)

OTHER PUBLICATIONS

White Paper—The Impact of Frequency in Non-Contacting Radar Level Measurement; publication 00870-0100-4026, Rev AA; Oct. 2016; Emerson Process Management; Shakopee, MN 55379, USA. (Year: 2016).*
(Continued)

*Primary Examiner* — Bernarr E Gregory
(74) *Attorney, Agent, or Firm* — Mark A. Logan; Endress+Hauser (USA) Holding Inc.

(57) ABSTRACT

The disclosure relates to a method for measuring fill level of a fill substance using terahertz (THz) pulses or for determining distance to an object using terahertz pulses, as well as to a fill-level measuring device suitable for performing such method. The THz pulses are transmitted with a repetition frequency, wherein the repetition frequency according to the invention is controlled in such a manner as a function of travel time that the repetition frequency increases in the case of decreasing travel time and decreases in the case of increasing travel time. The separation or the fill level is determined not based on the measured travel time, but is based on repetition frequency. An exact fill level determi-
(Continued)

nation can be performed based on THz pulses, even when the frequency of the THz pulses significantly fluctuates. Consequently, very simply embodied pulse production units with comparatively small requirements for frequency stability of the THz pulses can be used.

18 Claims, 6 Drawing Sheets

(51) Int. Cl.
    *G01S 13/10*     (2006.01)
    *G01S 13/36*     (2006.01)
    *G01S 7/282*     (2006.01)
    *G01S 13/30*     (2006.01)
    *G01S 13/88*     (2006.01)
    *G01S 13/12*     (2006.01)
    *G01S 13/00*     (2006.01)

(52) U.S. Cl.
    CPC .......... *G01F 23/2928* (2013.01); *G01S 7/282* (2013.01); *G01S 13/103* (2013.01); *G01S 13/12* (2013.01); *G01S 13/30* (2013.01); *G01S 13/36* (2013.01); *G01S 13/88* (2013.01)

(56) References Cited

U.S. PATENT DOCUMENTS

| | | | | |
|---|---|---|---|---|
| 5,847,567 A | * | 12/1998 | Kielb | G01F 23/284 324/642 |
| 6,087,978 A | * | 7/2000 | Lalla | G01S 13/103 342/118 |
| 6,621,450 B1 | * | 9/2003 | Carter | G01S 13/227 342/137 |
| 6,995,706 B2 | * | 2/2006 | Ohlsson | G01F 23/284 342/118 |
| 7,412,337 B2 | * | 8/2008 | Michalski | G01F 23/284 702/55 |
| 8,552,744 B2 | * | 10/2013 | Michalski | G01F 23/284 324/629 |
| 9,593,976 B2 | * | 3/2017 | Nilsson | G01F 23/284 |
| 2009/0033543 A1 | * | 2/2009 | Nilsson | G01S 13/88 342/124 |
| 2012/0137767 A1 | * | 6/2012 | Silvermint | G01F 23/284 73/290 R |
| 2015/0160066 A1 | * | 6/2015 | Sai | G01F 23/284 342/21 |
| 2016/0266240 A1 | * | 9/2016 | Hughes et al. | G01F 23/284 |

FOREIGN PATENT DOCUMENTS

| | | |
|---|---|---|
| EP | 1072871 A2 | 1/2001 |
| EP | 1235059 A1 | 8/2002 |
| EP | 2026046 A2 | 2/2009 |
| JP | H09127231 A | 5/1997 |
| SE | 1200072 A1 | 2/2012 |
| WO | 0161287 A1 | 8/2001 |
| WO | 2001061287 A1 | 8/2001 |
| WO | 2008012029 A1 | 1/2008 |

OTHER PUBLICATIONS

Search Report for International Patent Application No. PCT/EP2017/053100, WIPO, dated May 4, 2017, 13 pp.

* cited by examiner

METHOD FOR MEASURING FILL LEVEL OF A FILL SUBSTANCE LOCATED IN A CONTAINER BY MEANS OF TERAHERTZ PULSES

CROSS-REFERENCE TO RELATED APPLICATIONS

The present application is related to and claims the priority benefit of German Patent Application No. 10 2016 103 740.0, filed on Mar. 2, 2016 and International Patent Application No. PCT/EP2017/053100, filed on Feb. 13, 2017 the entire contents of which are incorporated herein by reference.

TECHNICAL FIELD

The invention relates to a method for measuring fill level of a fill substance located in a container by means of terahertz pulses, as well as to a fill-level measuring device suitable for performing such method.

BACKGROUND

In automation technology, especially in process automation technology, field devices are often applied, which serve for registering and/or influencing process variables. Serving for registering process variables are sensors, which are integrated, for example, in fill level measuring devices, flow measuring devices, pressure- and temperature measuring devices, pH-redox potential measuring devices, conductivity measuring devices, etc., which register the corresponding process variables, fill level, flow, pressure, temperature, pH-value, redox potential, and conductivity, respectively. Serving for influencing process variables are actuators, such as, for example, valves or pumps, via which the flow of a liquid in a pipeline section or the fill level in a container can be changed. Referred to as field devices are, in principle, all those devices, which are applied near to the process and which deliver, or process, process relevant information. In connection with the invention, the terminology, field devices, thus includes also remote I/Os, radio adapters, and, generally, electronic components, which are arranged at the field level. A large number of such field devices are manufactured and sold by the firm, Endress+Hauser.

For fill level measurement, contactless measuring methods are becoming popular, since they are robust and characterized by low maintenance. A further advantage of these methods is that they can measure virtually continuously. A favorite of these methods is the radar-based measuring method working according to the pulse travel time principle. In the case of this measuring method, which also is known under the name, pulse radar, short microwave pulses are periodically sent with a fixed repetition frequency ($f_{pulse}$), e.g. in an order of magnitude of 1 to 2 MHz, toward the fill substance. Their signal fractions reflected back in the direction of the transmitting- and receiving system are then received after a travel time t dependent on the path traveled in the container. The fill level is calculated from the measured travel time t.

Pulse travel time-based, fill level measuring devices of the state of the art work at microwave frequencies in a range between 0.2 GHz and 100 GHz. In such case, it is, in principle, necessary, that the frequency fluctuates as little as possible, in order that the fill level measurement delivers exact values. The choice of frequency has additionally a strong influence on the design of the fill level measuring device. It affects, among other things, the geometry of the transmitting-, receiving antenna. The higher the frequency, the smaller the antenna can be dimensioned, without that its radiation lobe expands.

The advantage of a small antenna is that the fill-level measuring device, as a whole, can be embodied compactly. Smaller space consumption means that the arrangement on the container is simplified.

The advantage of a narrow radiation cone, thus strongly focused microwave pulses, is, on the one hand, that the signal efficiency rises, since the intensity of the reflected microwave pulses increases. On the other hand, disturbance echos arising from reflection on peripheral objects, such as e.g. the container wall, are reduced.

From these considerations, it is clear that choice of an as high as possible frequency of the microwave pulses is advantageous. For, in this way, in the case of a small antenna, for example implemented with a very small flange, a narrow radiation lobe can be achieved. These ideas hold not only for higher frequency microwave pulses, but, instead, also for yet very much higher frequency pulses in the terahertz region (in the following abbreviated as THz: In the context of this invention, this region includes electromagnetic waves in a frequency range between 300 GHz and 3 THz).

According to the state of the art, technical solutions for producing electromagnetic waves in the THz region are already known: For example, so called "free electron lasers" can be applied. Using this technique, electromagnetic waves in the THz region can be produced with a comparatively stable frequency. Main component of these lasers is, however, a very complex, high energy, particle accelerator, so that a compact and low power form of construction of such a laser is not, as a practical matter, possible.

Known under the label "Gunn element" are semiconductor components, which are made of n-doped zones of differing doping. These are likewise able to produce electromagnetic waves in the THz region. Since they are, however, non-linear electrical components, the frequency of the electromagnetic waves in the THz region is very unstable.

Although electromagnetic pulses in the THz region are, due to the mentioned reasons, in principle, advantageous compared with microwave pulses, the above mentioned technical solutions for THz-wave production form thus no suitable basis for transfer of the pulse travel time method to a fill level measurement by means of THz pulses. Either the described methods for THz wave production are not technically implementable with justifiable effort. Or they are not able to produce THz pulses with a frequency, which is stable enough for an exact fill level determination by means of the pulse travel time-method.

SUMMARY

An object of the invention, therefore, is to provide a method for exact fill level measurement based on THz pulses as well as to provide a fill-level measuring device suitable for performing such method.

The invention achieves this object by a method for measuring fill level (L) of a fill substance located in a container by means of THz pulses or for determining distance (h-L) to an object by means of THz pulses. For this, the method includes method steps as follows:
  A THz pulse is transmitted toward the fill substance,
    the THz pulse is reflected on the surface of the fill substance, the reflected THz pulse is received after a travel time (t) dependent on the fill level (L).

In such case, the method steps are cyclically repeated with a repetition frequency ($f_{pulse}$) and the repetition frequency ($f_{pulse}$) is controlled in such a manner as a function of travel time (t) that the repetition frequency ($f_{pulse}$) increases in the case of decreasing travel time (t) and decreases in the case of increasing travel time (t). According to the invention, the fill level (L) is determined based on the repetition frequency ($f_{pulse}$), and not, such as usual in the pulse travel time method, based on the travel time (t).

The advantage of the method of the invention is that an exact fill level determination can be performed based on THz pulses, even when the frequency of the THz pulses fluctuates significantly. It is possible, consequently, to use very simply embodied pulse production units with comparatively small requirements on their frequency stability.

A first embodiment of the method provides that the repetition frequency ($f_{pulse}$) is proportional to the reciprocal of the travel time (t). In the simplest case, the repetition frequency ($f_{pulse}$) corresponds directly to the reciprocal. In this case, the following THz pulse is transmitted directly after receipt of the reflected THz pulse.

Alternatively, the repetition frequency ($f_{pulse}$) is proportional to the reciprocal of the sum of travel time (t) and a predefined time delay a ($t_{delay}$). In this way, the near region of the fill level measuring device, in which possibly systematic disturbance signal fractions are produced, can be masked out. In such case, the depth of the near range is defined by the time delay ($t_{delay}$).

Furthermore, the object of the invention is achieved by a fill-level measuring device for performing the method described in at least one of the preceding claims. For this, the fill-level measuring device includes components as follows:
A pulse production unit for periodically producing a THz pulse with a repetition frequency ($f_{pulse}$),
a first waveguide having
a signal input, via which the THz pulse is coupled from the pulse production unit into the waveguide,
a wave transmission unit adjoining the signal input,
an antenna unit adjoining the wave transmission unit for transmitting the THz pulse into the container and for receiving the THz pulse reflected on the surface of the fill substance after a travel time (t) dependent on the fill level (L), and
a signal output arranged on the wave transmission unit for producing an electrical control signal (S) based on the reflected THz pulse.

Moreover, the fill-level measuring device of the invention includes:
A control/evaluation unit for controlling the pulse production unit and/or for determining the fill level (L).

To the extent that the near region of the fill level measuring device is to be masked out, an advantageous form of embodiment of the fill level measuring device of the invention provides that the control/evaluation unit includes a delay circuit for time delay ($t_{delay}$) of the electrical control signal (S).

A possible embodiment relative to the pulse production unit of the fill level measuring device of the invention provides that the pulse production unit includes at least a first oscillator unit and a second oscillator unit, which, in each case, serve for producing electromagnetic waves in the microwave region, and a mixer for mixing the electromagnetic waves emanating from the oscillator units. Based on this embodiment, there is additionally the opportunity that the pulse production unit has a cascaded construction, with, in each case, at least a first oscillator unit and a second oscillator unit and, in each case, one mixer per cascade stage.

Independently of whether the above described oscillator unit has a cascaded construction, advantageously, the pulse production unit has at least one modulation element, which modulates electromagnetic waves produced by the first oscillator unit and/or the second oscillator unit. The modulation can be an amplification, a production of high- or low frequency harmonic waves, or an attenuation.

For the case, in which the fill-level measuring device of the invention has a cascaded pulse production unit, an advantageous extension of the fill level measuring device provides that it supplementally includes
a second waveguide having
a first endpiece, which is coupled to the wave transmission unit, and
a second endpiece, which is coupled between the first cascade stage and the second cascade stage.

In this case, it is supplementally advantageous, when the second waveguide includes a modulation unit for modulating the frequency of the reflected THz pulse. By this further development, it is possible, instead of, or supplementally to, a time delay by the control/evaluation unit, also to cause a time delay ($t_{delay}$) of the electrical control signal (S), and, thus, a masking of the near range.

In the sense of the invention, it is, on the one hand, possible to manufacture the first waveguide and/or the second waveguide of a dielectric material. Such a form of embodiment offers the advantage that the first waveguide can be applied, for example, as a dielectric structure on a circuit board. In this way, in principle, the entire fill-level measuring device of the invention could be placed on a single circuit board. Especially, the first waveguide and/or the second waveguide can, however, also be embodied each as a hollow conductor. In this way, potentially more degrees of freedom are available for the dimensioning of the first and/or the second waveguide.

In a simple embodiment, the signal input of the first waveguide can be embodied as a plate or diaphragm. For an improved coupling of the pulse production unit to the first waveguide, it is, in contrast, advantageous to embody the signal input as a cone. Here it is especially advantageous, when the signal input with reference to the wave transmission unit has an angle of, for instance, 90°.

BRIEF DESCRIPTION OF THE DRAWINGS

The invention will now be explained in greater detail based on the appended drawing, the figures of which show as follows.

DETAILED DESCRIPTION

Figure 1:
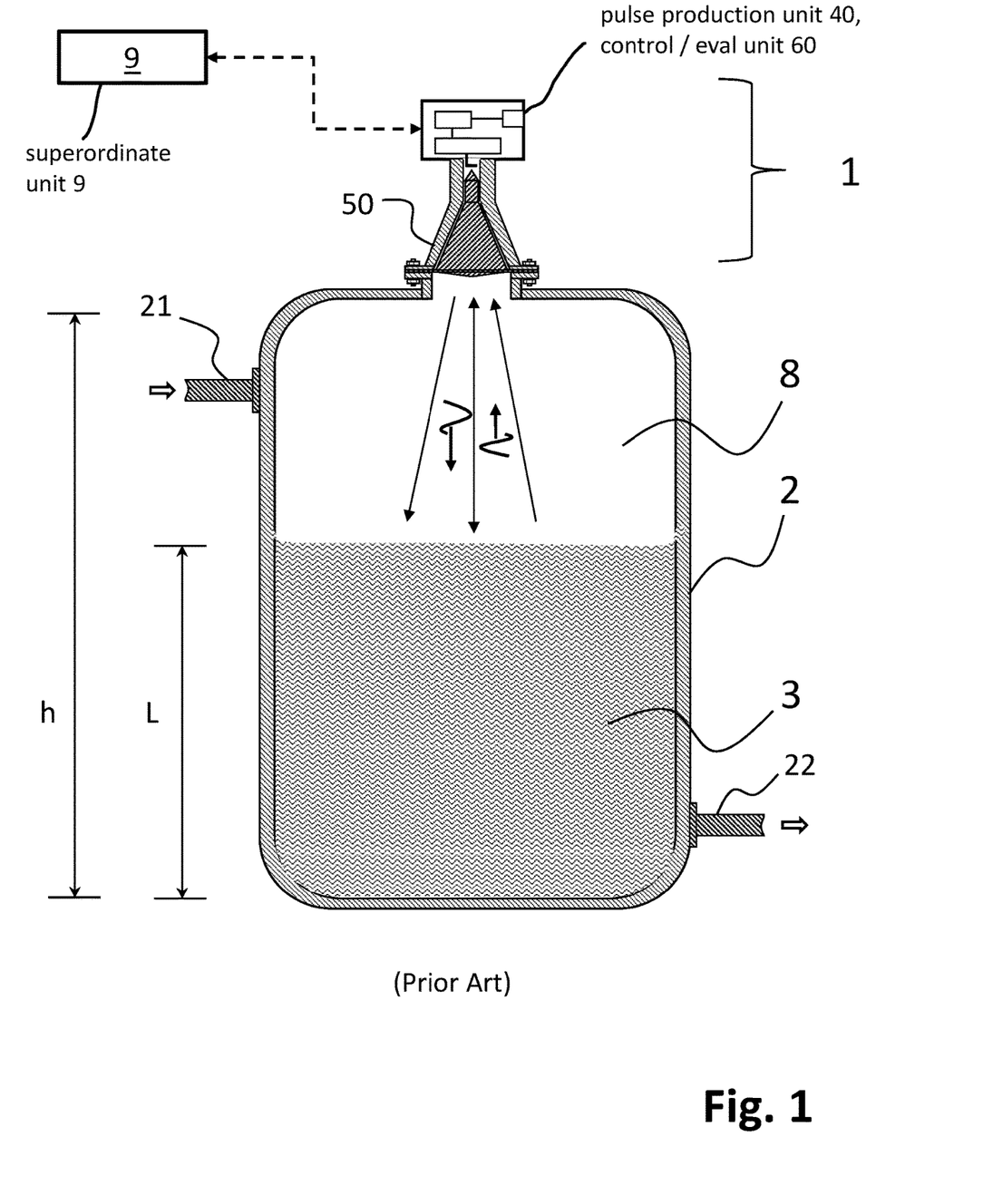
FIG. 1 shows a typical arrangement on a container of a fill level measuring device working according to the pulse travel time principle.

FIG. 1 shows a typical arrangement on a container 2 of a fill level measuring device 1 working according to the pulse travel time principle. Located in a process space 8 of the container 1 is a fill substance 3, whose fill level L is to be determined by the fill-level measuring device 1. To this end, the fill-level measuring device 1 is installed above the fill substance 3 at a known height h on the container 2. The container 2, or the process space 8, can, depending on application, be more than 30 m high.

The fill-level measuring device 1 is arranged on the container 2 in such a manner that it transmits electromagnetic pulses in the direction of the surface of the fill substance 3. After reflection on the fill substance surface, the fill-level measuring device 1 receives the reflected pulses after a travel time t as a function of distance h-L to the fill substance surface. In the case of fill-level measuring devices of the state of the art, the fill level L is calculated based on the measured travel time t.

As a rule, the fill-level measuring device 1 is connected via a bus system, for instance, "PROFIBUS", "HART" or "wireless HART", with a superordinated unit 9, for example, a process control system. In this way, on the one hand, information concerning the operating state of the fill level measuring device 1 can be communicated. Also information concerning the fill level L can be transmitted, in order, in given cases, to control inflows 21 and/or outflows 22 of the container.

Also the fill-level measuring device 1 of the invention is arranged on the container 2, such as schematically shown in FIG. 1. As essential main components, it includes:

A pulse production unit 40 for producing THz pulses with a repetition frequency $f_{pulse}$, a first waveguide 50 for transmitting the THz pulses into the process space 8 and for receiving the THz pulses after reflection of the THz pulses on the fill substance surface after a travel time t, as well as a control/evaluation unit 60 for controlling the pulse production unit 40 and/or for ascertaining the fill level L, wherein the control/evaluation unit 60 controls the repetition frequency $f_{pulse}$ in such a manner as a function of travel time t that the repetition frequency $f_{pulse}$ in the case of decreasing travel time t increases and in the case of increasing travel time t decreases, and wherein the control/evaluation unit 60 determines the fill level L based on the repetition frequency $f_{pulse}$.

Figure 2:
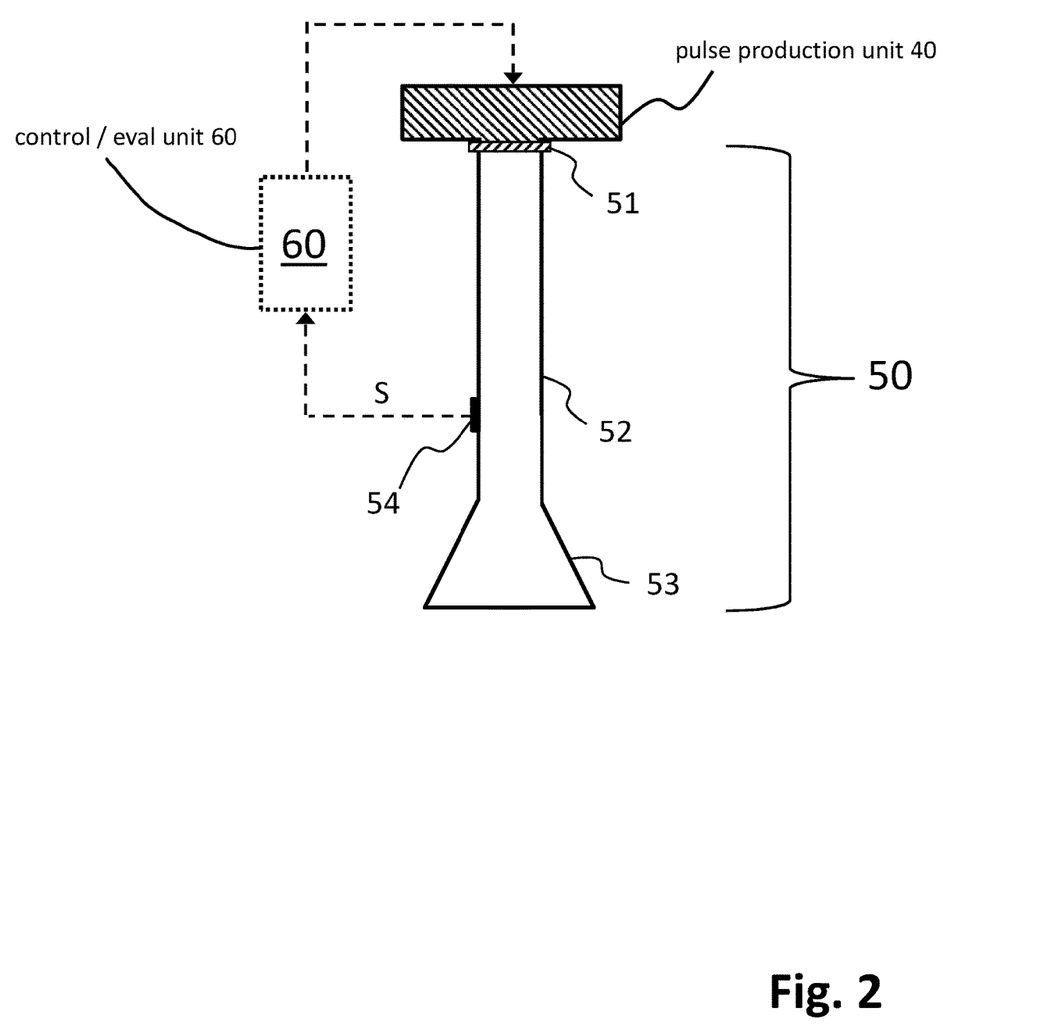
FIG. 2 shows a first embodiment of a fill level measuring device of the invention.

FIG. 2 shows a first embodiment of the fill level measuring device 1 of the invention: In the case of this form of embodiment, the first waveguide 50 is embodied as a hollow conductor, wherein the THz pulses of the pulse production unit 40 are coupled in via a signal input 51. This is embodied in FIG. 2 as a flat plate, preferably an electrically conductive or semiconducting, flat plate. Alternatively, also a cone-shaped signal input 51 would provide a suitable option, in given cases, angled at about 90°.

Following on the signal input 51 is a wave transmission unit 52. Its design affects a number of target variables:

The quality factor of the THz pulses to be emitted: This depends essentially on the dimensioning of the wave transmission unit 52, the frequency of the THz pulses and their pulse width. An advantageous dimensional example in this regard for a frequency of the THz pulses of 1.0 THz is to make the inner cross section of the wave transmission unit 52 of dimensions, 0.7×0.5 mm. In this case, the signal input 51 also measures 0.7×0.5 mm.

The bandwidth(s) of the THz pulses to be emitted: Also this depends on the dimensioning of the wave transmission unit 52. Additionally, the wave transmission unit 52 can comprise one or more elements for producing harmonics, for example, appropriately dimensioned orifices within the wave transmission unit 52.

Following on the wave transmission unit 52 is an antenna unit 53, via which the THz pulses are radiated into the process space 8. Likewise received by the antenna unit 53 are the THz pulses reflected on the fill substance surface. For protection of the inner space of the first waveguide 50 against deposits, especially against deposits caused by the fill substance 3, the additional use of a seal (not shown in FIG. 2) within the antenna unit 53 is advantageous. Such a seal can be made of a material, which seals against gas, for example, PS, PTFE, ceramic or glass.

For producing an electrical control signal S based on the reflected THz pulse, a signal output 54 is provided on the wave transmission unit 52. This can be embodied, for example, as a grating with corresponding mesh density for 3 dB partial out-coupling. For changing the reflected THz pulse into the electrical control signal S, for example, a diode mixer can be used, which is arranged in the signal output 54. Preferably, the signal output 54 is located with reference to the wave transmission unit 52 at a position, where the signal strength, especially the voltage amplitude of the reflected THz pulse within the wave transmission unit 52, is as great as possible. In order to achieve this, it is advantageous to arrange the signal output 54 in such a manner with respect to the phase of the reflected THz pulse that echos, which arise from this on the signal input 51, are destructively superimposed by the reflected THz pulse.

The electrical control signal S is fed to the control/evaluation unit 60, where, depending on form of embodiment, further conditioning and/or further processing of the control signal S can occur, such as:

An amplification, or attenuation, in given cases, as a function of signal strength of the reflected THz pulse, a filtering for eliminating disturbance signal fractions, depending on situation using a high-, low- or bandpass filter, a predefined time delay $t_{delay}$, by which the repetition frequency $f_{pulse}$ is reduced. This can be utilized to mask out a near region of the fill level measuring device 1, in which possibly systematic disturbance signal fractions are produced. In such case, the depth of the near range is defined by the value of the time delay $t_{delay}$, and/or a digitizing of the control signal.

By means of the conditioned control signal S, the control/evaluation unit 60 controls the pulse production unit 40 according to the invention in such a manner that the repetition frequency $f_{pulse}$ increases in the case of decreasing travel time t and decreases in the case of increasing travel time t. Moreover, the control/evaluation unit 60 determines the fill level L based on the repetition frequency $f_{pulse}$. Naturally, the above mentioned functions of the control/evaluation unit 60 could also be achieved decentrally by a number of separate electronic components.

Instead of the embodiment of the fill level measuring device 1 of the invention illustrated in FIG. 2, in which the first waveguide 50 is constructed based on a hollow conductor structure, another option is to construct the first waveguide 50 based on a dielectric conductor material. Such a form of embodiment offers the advantage that the first waveguide 50 can be applied, for example, as a dielectric structure on a circuit board. In this way, it is possible, in principle, to place the entire fill-level measuring device 1 of the invention on a single circuit board.

Figure 3:
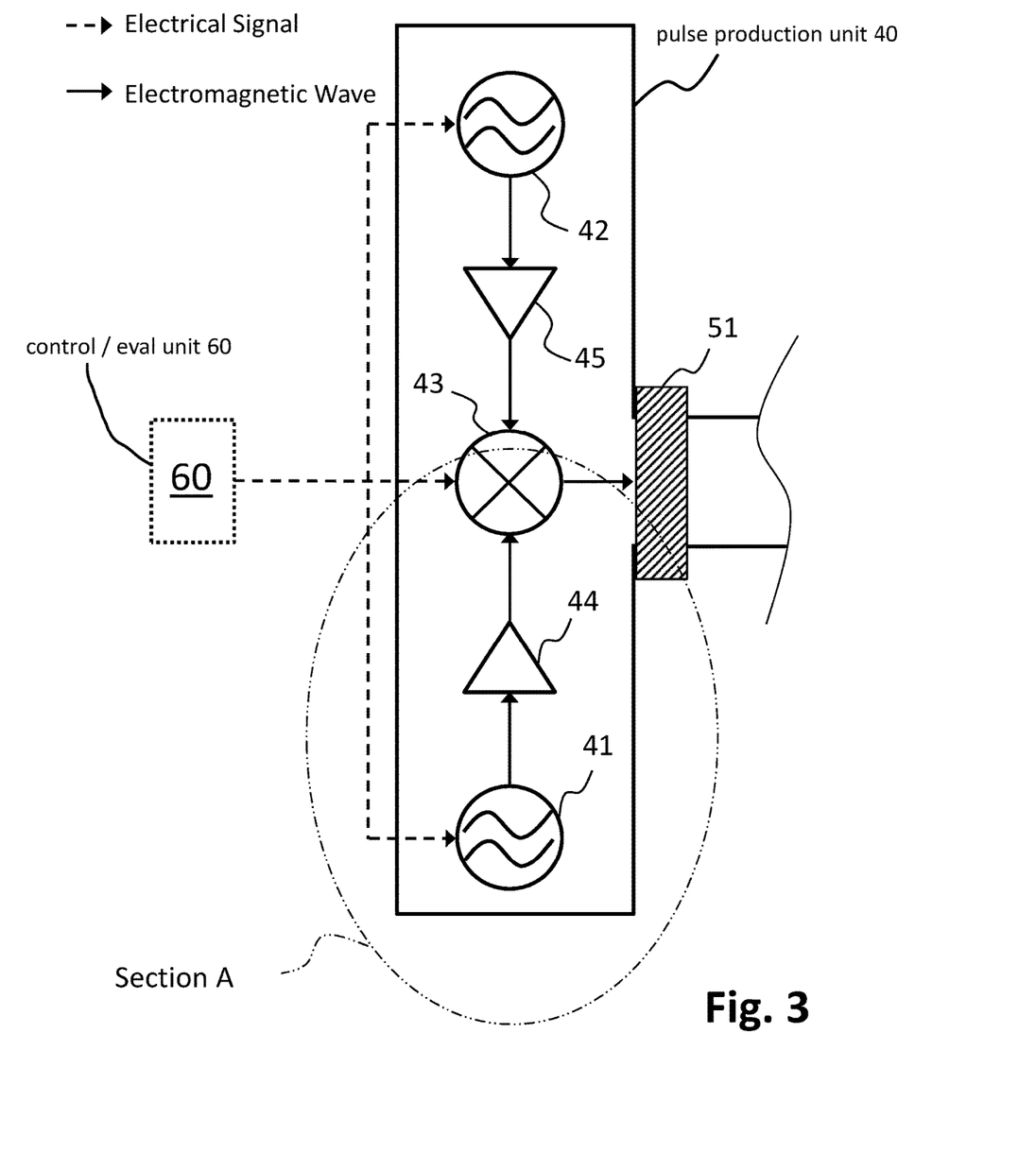
FIG. 3 shows a first embodiment of an oscillator unit.

FIG. 3 shows a possible form of embodiment of a pulse production unit 40 for application in the fill-level measuring device illustrated in FIG. 2: The construction shown there is based likewise on a hollow conductor. Arranged in this are two oscillator units 41, 42 at two oppositely lying end regions of the hollow conductor. They serve for producing electromagnetic waves in the microwave or THz region. The electromagnetic waves produced by the oscillator units 41, 42 are mixed in a mixer 43, which is arranged in the hollow conductor, for instance, centrally between the two end regions. Mixing with a corresponding multiplication or addition factor yields an electromagnetic wave in the THz region for in-coupling into the signal input 51. Used as mixer 43 can be, for example, a diode mixer. This is preferably arranged directly at the signal input 51.

In order that the electromagnetic waves in the THz region produced by the mixer 43 are produced in the form of THz pulses, at least two options can be provided in FIG. 3:

on the one hand, the two oscillator units 41, 42 can be operated by the control/evaluation unit 60 corresponding to the repetition frequency $f_{pulse}$ and a predefined pulse width. This type of operation has the advantage of a relatively small energy consumption, since the oscillator units 41, 42 are operated only when clocked on.

Alternatively, instead of the oscillator units 41, 42, the mixer 43 can be operated by the control/evaluation unit 60 corresponding to the repetition frequency $f_{pulse}$ and the predefined pulse width. The two oscillator units 41, 42 are, in this case, continuously operated. The advantage of this type of operation is that the frequency of the resulting THz pulse in the case of continuous operation of the oscillator units 41, 42 is stable.

Furthermore, the pulse production unit 40 shown in FIG. 3 includes two modulation elements 44, 45, which, in each case, modulate electromagnetic waves produced by the two oscillator units 41,42. For this, the modulation elements 44, 45 are preferably arranged between the oscillator units 41,42 and the mixer 43.

Figure 4:
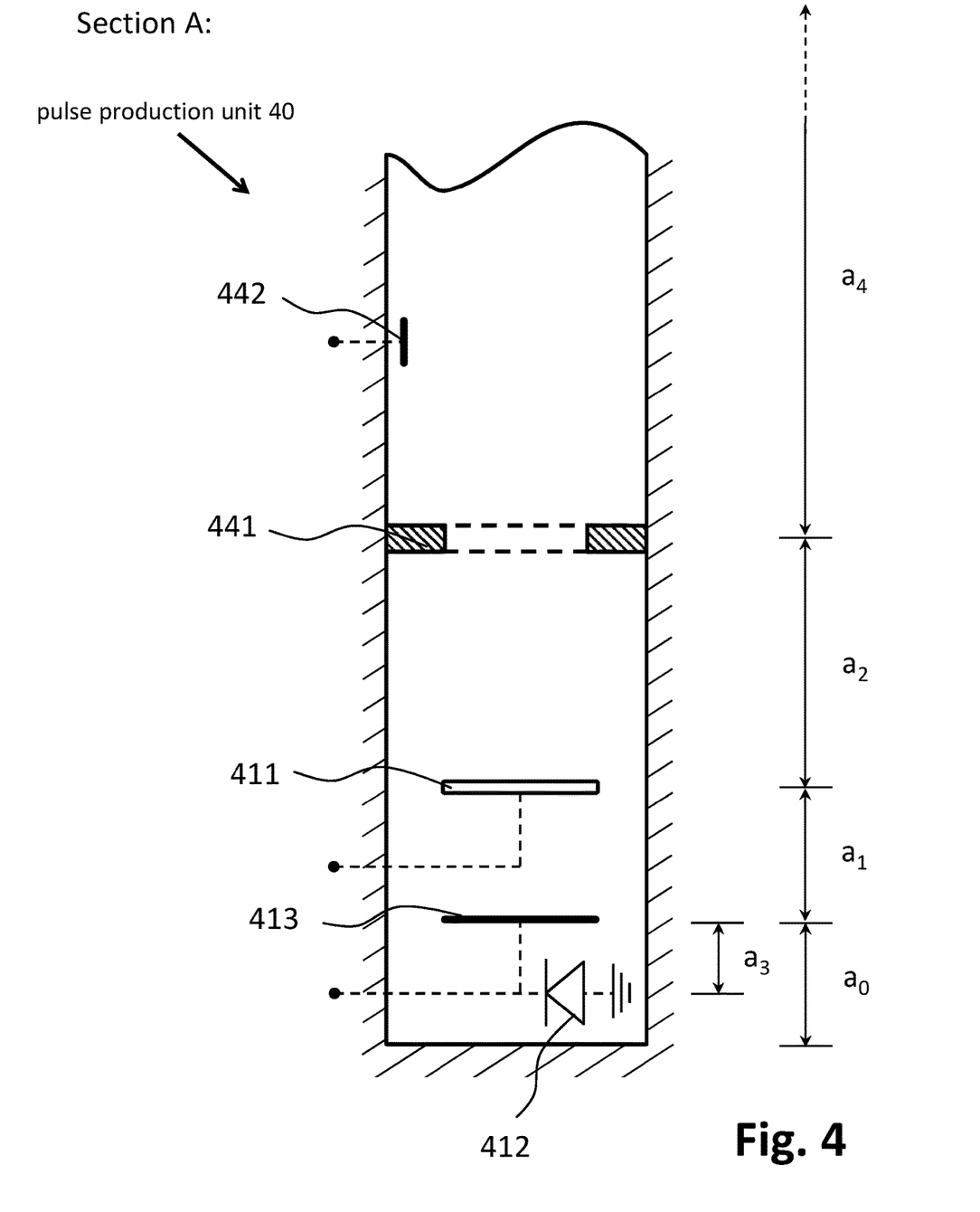
FIG. 4 shows a detail view of the oscillator unit illustrated in FIG. 3.

A detail A of the pulse production unit 40 illustrated in FIG. 3 is shown in FIG. 4. Detail A illustrates a possible embodiment for implementing the oscillator unit 41. In the case of this variant, a Gunn element 411, which produces electromagnetic waves with at least one fundamental microwave frequency, is applied. The Gunn element 411, depending on operating mode, is operated either by the control/evaluation unit 60 corresponding to the repetition frequency $f_{pulse}$ and the predefined pulse width or with a constant supply voltage. The separation $a_0+a_1$ between the Gunn element 411 and the end region of the hollow conductor is, in such case, preferably so dimensioned that, taking into consideration a possible shortening influence of the hollow conductor, it corresponds, at most, to a fourth of the wavelength of the microwave fundamental frequency.

As shown in FIG. 4, for modulating the at least one microwave fundamental frequency, it is, moreover, possible, supplementally to use at least one varactor diode 412 arranged in the hollow conductor and to couple it in the shown manner to an electrode 413. The varactor diode 412 and the electrode 413 are to be operated for this via a corresponding input signal. The input signal is preferably a defined noise signal. Other options would include for the purpose of simpler implementation, however, also a sawtooth- or sinusoidal alternating voltage signal, especially with a frequency between 1 MHz and 1 GHz.

Use of the varactor diode 412 and the electrode 413 effects a phase shift of the electromagnetic waves emitted from the Gunn element 411. In such case, it is advantageous so to choose the separation $a_1$ of the electrode 413 from the Gunn element 411 that it together with the length corresponding to that of the phase shift caused by the capacitance of the varactor diode 412 effects maximally a phase shift of the electromagnetic waves emitted by the Gunn element 411 of 90°.

Furthermore, shown in FIG. 4 is a possible embodiment for implementing the modulation element 44: In this variant, the modulation element 44 includes a diaphragm 441 and a diverter 442. The diaphragm 441 has primarily the function of partially reflecting the electromagnetic waves produced by the oscillator unit 41, which have at least the microwave fundamental frequency, in order by their superpositioning to produce besides the microwave fundamental frequency higher frequency fractions. In this regard, advantageously, the separation $a_1+a_2+a_3$ between the diaphragm 441 and the end region, or the separation $a_1+a_2$ from the Gunn element 411, has a length other than the separation $a_4$ between the diaphragm 441 and the wave transmission unit 50.

The diverter 442 is provided for removing undesired low frequency fractions from the electromagnetic waves transmitted from the oscillator unit 41.

Alternatively to the diaphragm 441, there is another variant for producing high-frequency fractions, which is not shown in FIG. 4: this variant involves the division of the electromagnetic waves emanating from the oscillator unit 41 onto at least two differently long signal paths and a following reuniting of the divided fractions within the pulse production unit 40. From differences of the signal path lengths arise one or more phase differences, which upon the superpositioning of the divided electromagnetic waves produce at least one predefined harmonic.

The practical example illustrated in FIG. 4 regarding the modulation element 44 and the oscillator unit 41 can naturally also be applied analogously to those parts of the pulse production unit 40, which are not shown in FIG. 4.

Figure 5:
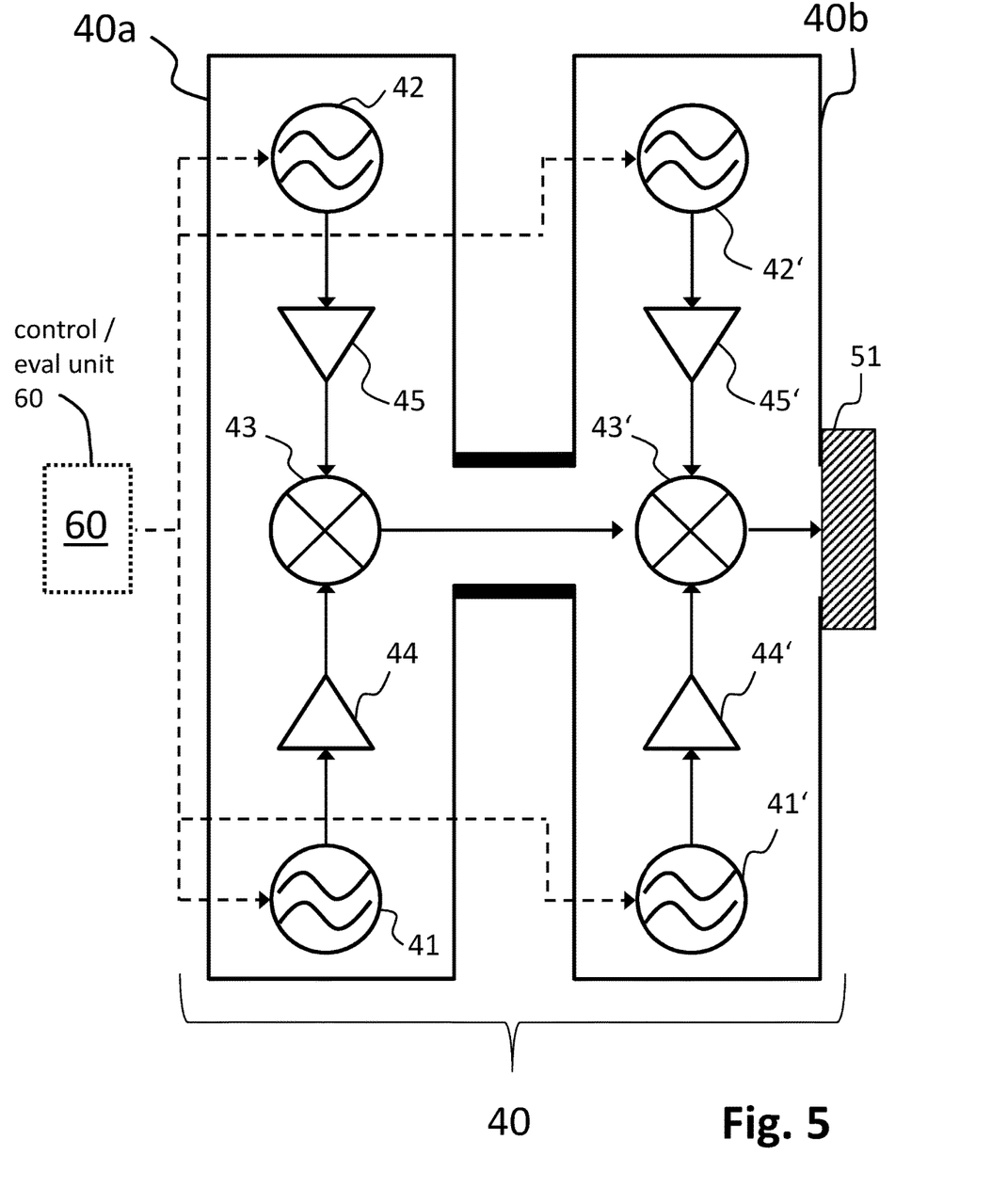
FIG. 5 shows a second, cascaded embodiment of the oscillator unit.

A cascaded embodiment of the pulse production unit 40 illustrated in FIG. 3 or FIG. 4 is shown in FIG. 5. In the case of this embodiment, in a first cascade stage 40a, electromagnetic waves of two oscillator units 41, 42 are mixed upwards by a first mixer 43, such as was done in the case of the pulse production unit 40 illustrated in FIG. 3. In the case of the cascaded embodiment, the upmixed electromagnetic wave is, however, not directly fed to the signal input 51 of the first waveguide 50, but, instead, to a second mixer 43' of a second cascade stage 40b. Only after further upmixing by the mixer 43' of the second cascade stage 40b is the resulting THz pulse in-coupled into the signal input 51. The second cascade stage 40b has in the illustrated embodiment a construction analogous, in principle, to that of the first cascade stage 40a.

The two cascade stages 40a, 40b are preferably controlled by the control/evaluation unit 60 in such a manner that the signals of the individual oscillator units 41, 41', 42, 42' as much as possible do not correlate, i.e. they differ as much as much as possible. In this way, higher harmonic waves are favored over lower and a mixing down of the harmonic waves is lessened.

In comparison to the non-cascaded construction, the advantage of a cascaded construction is that either higher frequency THz pulses can be produced or the multiplication factor of the individual cascade stages can be made smaller, without reducing the frequency of the resulting THz pulse.

The advantage of a smaller multiplication factor is an, in total, higher conversion efficiency for the mixers 43, 43'. In this way, either a higher transmission power at equal energy consumption or a lower energy consumption of the fill level measuring device 1 is achieved. Thus, there results a higher range, potentially more compact and more price favorable embodiment of the antenna unit 53.

Figure 6:
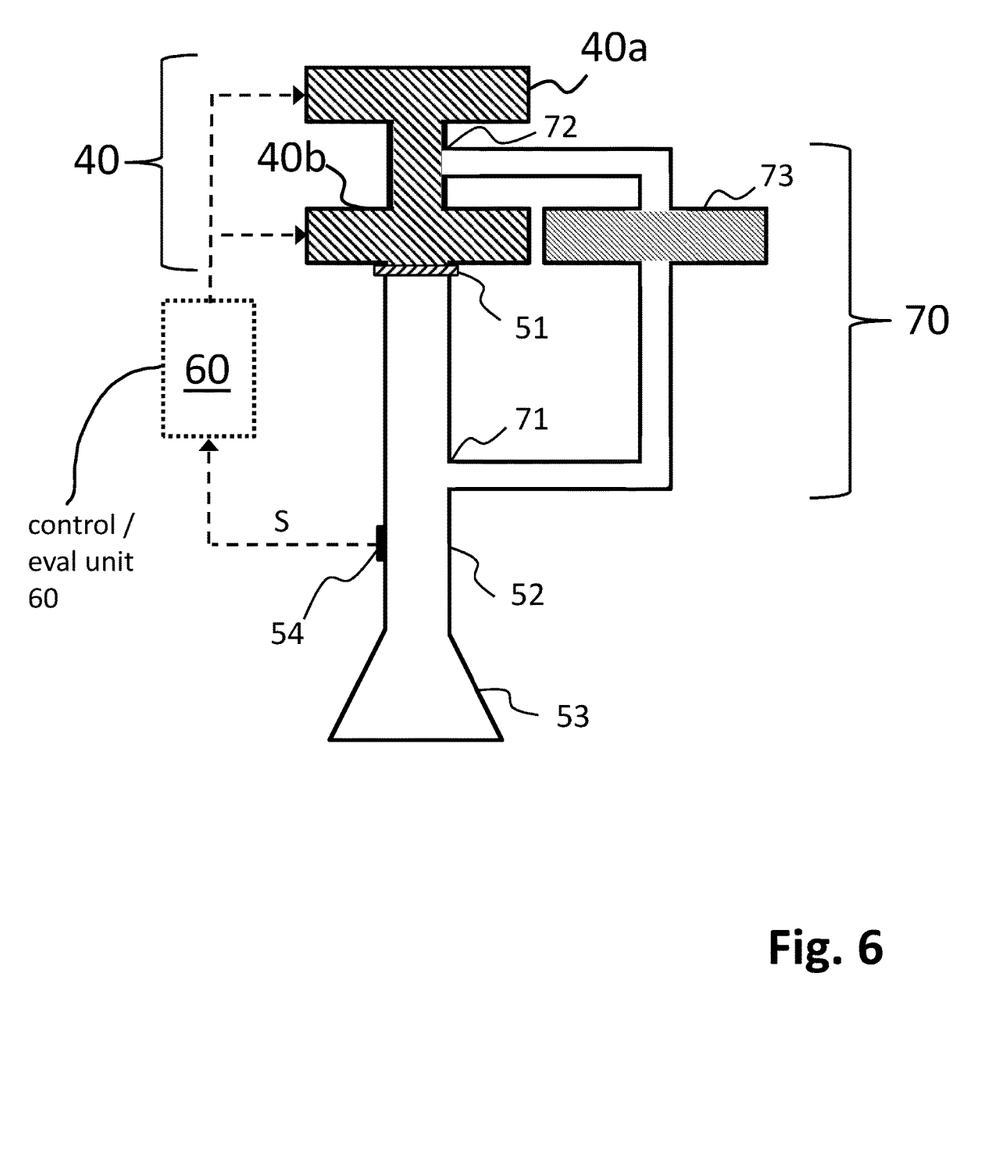
FIG. 6 shows a second embodiment of the fill level measuring device of the invention.

FIG. 6 shows a fill-level measuring device of the invention 1, which has a cascaded pulse production unit 40. The fill-level measuring device 1 shown in this case differs from the fill-level measuring device 1 shown in FIG. 2, however, not only as concerns the cascaded construction of the pulse production unit 40. Thus, the embodiment shown in FIG. 6 includes a second waveguide 70. The function of second waveguide 70 is to delay the production of the control signal S on the signal output 54 after receipt of the reflected THz pulse.

For this, the second waveguide 70 is coupled to the wave transmission unit-52 via a first endpiece 71. Via a second endpiece 72, the second waveguide 70 is coupled to the pulse production unit 40 between the first cascade stage 40a and the second cascade stage 40b. Additionally, the second waveguide 70 includes a modulator unit 73 for down mixing the frequency of the reflected THz pulse. The modulator unit 73 can have, for example, a construction, which, in principle, is analogous to the construction of the pulse production unit 40 shown in FIG. 3. Preferably, the modulator unit 73 and/or the second waveguide 70 are/is dimensioned in such a manner that the frequency of the reflected THz pulse after down mixing corresponds to the frequency of the electromagnetic wave produced by the first cascade stage 40a.

Second waveguide 70 thus provides for the reflected THz pulses, in addition to the direct signal path between the antenna unit 53 and the signal output 54, another, elongated signal path between the antenna unit 53 and the signal output 54. Accordingly, the first waveguide 50 and the second waveguide are preferably dimensioned in such a manner that the reflected THz pulse is led through the elongated signal path with a higher power than via the direct signal path to the signal output.

The second waveguide and the signal path associated therewith effect a time delay ($t_{delay}$) of the control signal S. Thus, the form of embodiment shown in FIG. 6 offers the advantage that the control/evaluation unit 60, in this case, needs no additional time delay unit. A further advantage is that the reflected THz pulse is decoupled more efficiently from the transmitted THz pulse, so that also very weakly reflected THz pulses can be detected.

The invention claimed is:

1. A fill-level measuring device, comprising:
   a pulse production unit embodied to produce pulses of electromagnetic radiation having a frequency in the range from 300 GHz to 3 THz, wherein the pulse production unit is configured to periodically produce the pulses at a repetition frequency;
   a first waveguide having a signal input via which the pulses are coupled from the pulse production unit into the first waveguide;
   a wave transmission unit adjoining the signal input;
   an antenna unit adjoining the wave transmission unit, wherein the antenna unit is embodied to transmit the pulses into a container and to receive the pulses reflected on a surface of a fill substance in the container after a travel time dependent on a fill level;
   a signal output circuit arranged on the wave transmission unit and embodied to produce an electrical control signal based on the reflected pulses; and
   a control/evaluation unit configured to control the pulse production unit and to determine the fill level.

2. The fill-level measuring device as claimed in claim 1, wherein the control/evaluation unit includes a delay circuit configured to time-delay the electrical control signal.

3. The fill-level measuring device as claimed in claim 1, wherein the pulse production unit includes a first oscillator unit, a second oscillator unit, and a mixer.

4. The fill-level measuring device as claimed in claim 3, wherein the pulse production unit further includes at least one modulation element configured to modulate electromagnetic waves produced by the first oscillator unit and/or by the second oscillator unit.

5. The fill-level measuring device as claimed in claim 1, wherein the pulse production unit includes a first stage having a first oscillator unit, a second oscillator unit, and a mixer and further includes a second stage having a first oscillator unit, a second oscillator unit, and a mixer, wherein the second stage is cascaded with the first stage.

6. The fill-level measuring device as claimed in claim 5, further comprising:
   a second waveguide having a first endpiece coupled to the wave transmission unit and a second endpiece coupled between the first cascade stage and the second cascade stage.

7. The fill-level measuring device as claimed in claim 6, wherein the second waveguide includes a modulation unit configured to modulate a frequency of the reflected pulse.

8. The fill-level measuring device as claimed in claim 6, wherein the first waveguide and the second waveguide are embodied of a dielectric material.

9. The fill-level measuring device as claimed in claim 6, wherein the first waveguide and the second waveguide are each embodied as a hollow conductor.

10. The fill-level measuring device as claimed in claim 1, wherein the signal input is embodied as a plate or a diaphragm.

11. The fill-level measuring device as claimed in claim 1, wherein the signal input is embodied as a cone.

12. The fill-level measuring device as claimed in claim 11, wherein the signal input with reference to the wave transmission unit has an angle of 90°.

13. The fill-level measuring device as claimed in claim 1, wherein the control/evaluation unit includes a delay circuit configured to time-delay the electrical control signal.

14. The fill-level measuring device of claim 1, wherein the signal output circuit includes a grating having a mesh density for 3 dB partial out-coupling.

15. The fill-level measuring device of claim 14, wherein the signal output circuit further includes a diode mixer.

16. A method for measuring a fill level of a fill substance in a container, comprising:
   providing a fill-level measuring device, comprising:
      a pulse production unit embodied to produce pulses of electromagnetic radiation having a frequency in the range from 300 GHz to 3 THz, wherein the pulse production unit is configured to periodically produce the pulses at a repetition frequency;
      a first waveguide having a signal input via which the pulses are coupled from the pulse production unit into the first waveguide;
      a wave transmission unit adjoining the signal input;
      an antenna unit adjoining the wave transmission unit, wherein the antenna unit is embodied to transmit the pulses into a container and to receive the pulses reflected on a surface of a fill substance in the container after a travel time dependent on a fill level;
      a signal output circuit arranged on the wave transmission unit and embodied to produce an electrical control signal based on the reflected pulses; and a control/evaluation unit configured to receive the electrical control signal, to determine the repetition frequency based on the electrical control signal, to control the pulse production unit to produce the pulses at the repetition frequency, and to determine the fill level;

transmitting a pulse of electromagnetic radiation from the fill-level measuring device toward the fill substance such that the pulse is reflected on a surface of the fill substance, wherein the electromagnetic radiation has a frequency in the range from 300 GHz to 3 THz;

receiving a reflected pulse by the fill-level measuring device after a travel time dependent the fill level;

repeating cyclically at a repetition frequency the transmitting of a pulse and the receiving of a reflected pulse;

controlling the repetition frequency as a function of the travel time such that the repetition frequency increases when the travel time decreases and the repetition frequency decreases when the travel time increases; and determining the fill level based on the repetition frequency.

17. The method as claimed in claim 16, wherein the repetition frequency is proportional to a reciprocal of the travel time.

18. The method as claimed in claim 16, wherein the repetition frequency is proportional to a reciprocal of a sum of the travel time and a predefined time delay.

* * * * *